(12) United States Patent
Shortridge (10) Patent No.: US 12,432,245 B2
(45) Date of Patent: Sep. 30, 2025

(54) SYSTEM AND METHOD FOR CHAOS TESTING IN AN EDGE NETWORK

(71) Applicant: Fastly, Inc., San Francisco, CA (US)

(72) Inventor: Kelly Shortridge, New York, NY (US)

(73) Assignee: Fastly, Inc., San Francisco, CA (US)

( * ) Notice: Subject to any disclaimer, the term of this patent is extended or adjusted under 35 U.S.C. 154(b) by 211 days.

(21) Appl. No.: 17/898,931

(22) Filed: Aug. 30, 2022

(65) Prior Publication Data

US 2024/0073235 A1 Feb. 29, 2024

(51) Int. Cl.
*H04L 9/40* (2022.01)

(52) U.S. Cl.
CPC ...... *H04L 63/1433* (2013.01); *H04L 63/1425* (2013.01); *H04L 63/20* (2013.01)

(58) Field of Classification Search
CPC .. H04L 63/1433; H04L 63/1425; H04L 63/20
See application file for complete search history.

(56) References Cited

U.S. PATENT DOCUMENTS

| | | | | |
|---|---|---|---|---|
| 8,826,443 B1 * | 9/2014 | Raman | ................ | G06F 21/6245 726/26 |
| 8,914,406 B1 * | 12/2014 | Haugsnes | ........... | G06F 9/45558 710/316 |
| 9,075,990 B1 * | 7/2015 | Yang | ........................ | H04L 63/20 |
| 9,350,757 B1 * | 5/2016 | Falkowitz | ................ | H04L 67/14 |
| 10,200,384 B1 * | 2/2019 | Mushtaq | ................. | H04L 67/02 |
| 10,880,322 B1 * | 12/2020 | Jakobsson | ................ | H04L 51/08 |
| 11,909,764 B1 * | 2/2024 | Curran | ................ | H04L 63/1433 |
| 2002/0143933 A1 * | 10/2002 | Hind | ....................... | H04L 67/02 709/224 |
| 2002/0156836 A1 * | 10/2002 | Janosik, Jr. | ........... | H04L 67/564 709/203 |
| 2003/0018707 A1 * | 1/2003 | Flocken | ................ | H04L 67/535 709/224 |
| 2003/0195861 A1 * | 10/2003 | McClure | ............. | H04L 63/1408 |
| 2011/0099467 A1 * | 4/2011 | Kapur | ..................... | H04L 67/60 715/236 |
| 2011/0283359 A1 * | 11/2011 | Prince | ................. | H04L 63/1433 726/23 |
| 2012/0117222 A1 * | 5/2012 | Holloway | ............. | H04L 63/126 709/224 |
| 2014/0215560 A1 * | 7/2014 | Roberson | .............. | H04L 67/142 726/3 |
| 2014/0259147 A1 * | 9/2014 | L'Heureux | ............. | H04L 63/02 726/14 |
| 2015/0222656 A1 * | 8/2015 | Haugsnes | ............. | H04L 63/104 726/23 |
| 2015/0347751 A1 * | 12/2015 | Card | ..................... | H04L 51/214 726/23 |
| 2016/0182537 A1 * | 6/2016 | Tatourian | ............. | H04L 63/145 726/23 |
| 2017/0118241 A1 * | 4/2017 | Call | ..................... | H04L 67/535 |

(Continued)

*Primary Examiner* — Michael Won (57) ABSTRACT

Methods and apparatus are disclosed herein that enable an infrastructure service to implement security verification without significantly interrupting end user network traffic. The infrastructure service copies request messages and modifies a portion of the header information of the request message. Both the original message and the modified message are then sent for fulfillment. The infrastructure service compares the responses in order to create a security test report.

20 Claims, 8 Drawing Sheets

(56) References Cited

U.S. PATENT DOCUMENTS

| | | | | |
|---|---|---|---|---|
| 2018/0152471 A1* | 5/2018 | Jakobsson | ............ | H04L 63/1425 |
| 2018/0351986 A1* | 12/2018 | Johns | ................. | G06F 11/3688 |
| 2020/0167478 A1* | 5/2020 | Tammachi | ............. | H04L 63/20 |
| 2020/0351306 A1* | 11/2020 | Nedbal | ................... | H04L 63/20 |
| 2021/0021612 A1* | 1/2021 | Higbee | ............... | H04L 63/1491 |
| 2021/0281584 A1* | 9/2021 | Levine | ................. | G06F 21/554 |
| 2023/0367833 A1* | 11/2023 | Kol | .................... | H04L 63/0227 |

* cited by examiner

SYSTEM AND METHOD FOR CHAOS TESTING IN AN EDGE NETWORK

TECHNICAL FIELD

Aspects of the disclosure are related to the field of computing and communication networks and, more particularly, to security and resilience testing through automated chaos experimentation in an edge network.

BACKGROUND

Content delivery networks, edge cloud platforms, and other types of computing and communications infrastructure utilize load balancers to distribute traffic across servers. A typical load balancer receives incoming traffic from end users and directs it to various servers in accordance with a load balancing algorithm. The various servers also receive traffic from other network elements (such as users, cache servers, origin servers, etc.) that is directly addressed to the server. It may not be desirable for the load balancer to act on this other traffic.

Security in particular has grown in importance as distributed denial-of-service (DDoS) attacks and system compromise have become more frequent and destructive. Infrastructure services can provide a security function that shields origin servers from such malicious activity. When acting as a security shield, traffic destined for a given website or service routes through an infrastructure service provider's network, where it can be analyzed and potentially blocked so as to prevent malicious traffic from reaching customer servers.

In order to block malicious traffic, many websites have instructions which require certain information, such as cookies, to be present in the request message in order for the website to provide the requested content. Sometimes these instructions are complex and can be difficult to test prior to being deployed. At other times, while the instructions may be correct, the deployment may not be properly configured, resulting in failure to properly validate the incoming requests. In either case, along with other situations which one of skill in the art would understand, the website may fail to respond properly to qualified requests and/or may respond to unqualified requests. Both of these situations should be avoided. Even if the testing is not extremely difficult, it can be time consuming, and there may not be sufficient time to test prior to deployment.

OVERVIEW

Technology is disclosed herein for testing or experimentation with security measures for servers without significantly interrupting network service in the context of computing and communications networks. In an implementation, an infrastructure service receives a request message which comprises both a header portion and a payload portion. After determining that the request message will be tested, the infrastructure service creates a second request message, which comprises the payload portion and a modified header portion. The infrastructure service then forwards both the request message and the modified request message to a supply server and receives responses to each. The response to the original request message is forwarded to end user (or an agent that may operate on behalf of the end user), and the response to the modified request message is used to create a security report.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein relates to systems and methods for testing and/or conducting security experiments on network traffic, particularly for traffic responding to content requests from network end points. routing incoming packet flows within infrastructure services such as content delivery networks, cloud edge platforms and other computing and communications environments. In an implementation, a content request is provided to an edge network by a network end point. The content request can include header information and a payload.

The content request is provided to a server in the edge network or an origin server that is able to respond to the content request. In an implementation, the origin server or edge network server also includes instructions designed to help detect malicious activity. In an implementation, the instructions verify the source of the content request as indicated in the content request header, for example. The instructions might seek another piece of identification information, for example, a cookie, which is present in the header information in the request. In an implementation, the content request is duplicated and modified, such as by removing the "origin" header or altering cookies in the header portion. Both the original content request and the modified request(s) are then forwarded for a response. The response to the unaltered request is provided to the end point. While end point is used here, end point may refer to an actual end user, or an agent operating on behalf of an end user in response to their direct interaction, such as a web browser. Further, the end point could be an automated system that makes requests to the service undergoing chaos testing. The responses to all of the requests (both modified and unmodified) are compared. A verification report can then be prepared to indicate whether the instructions in the origin server or edge network server are correctly responding to request header information. In an implementation, this report is provided to a management server or some other end point.

Figure 1:
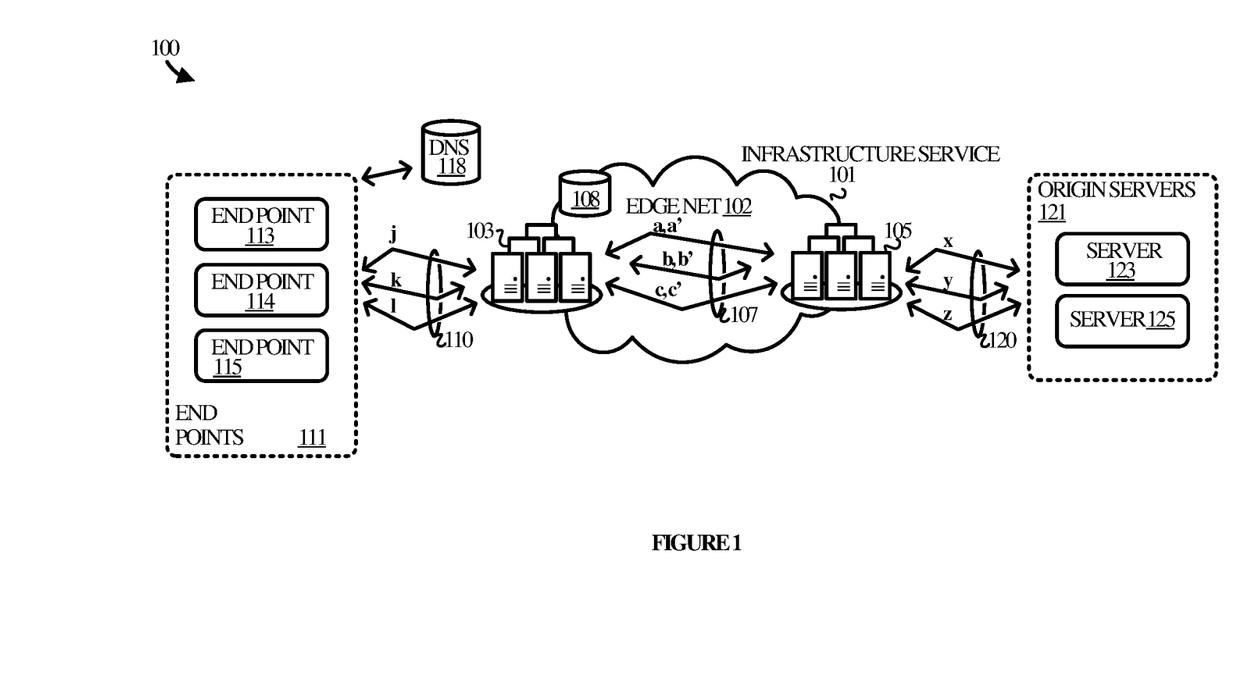
FIG. 1 illustrates an operational environment in an example implementation.

FIG. 1 illustrates an operational architecture 100 in an example implementation of security experimentation in an edge network. Operational architecture 100 includes infrastructure service 101 in communication with end points 111 and origin servers 121. Infrastructure service 101 provides one or more functions for and/or on behalf of its customers such as edge computing, content caching, image optimization, content streaming, cloud security, load balancing, and traffic acceleration.

Infrastructure service 101 includes one or more data centers, of which data center 103 and data center 105 are representative, connected by edge network 102. Edge network 102 is representative of one or more physical and/or virtual networks capable of connecting multiple data centers—or Points of Presence. Edge network 102 may be, for example, an overlay network that relies on the physical connections provided by one or more other network providers such transit network providers, Internet backbone providers, and the like.

Edge network 102 provides routes 107 to and from the data centers 103 and 105, represented by routes a, b, and c. Data center 103 and data center 105 each provide a Point of Presence (PoP) at an interface point between edge network 102 and other networks via which infrastructure service 101 may communicate with end points 111 and origin servers 121. Examples include transit networks, local Internet service provider (ISP) networks, local area networks (LANs), wide area networks (WANs), wired and wireless networks, virtual networks, software defined networks, and any combination or variation thereof.

One or more networks that connect edge network 102 to end points 111 may be the same as one or more of the networks that provide the physical connectivity of edge network 102. Similarly, one or more of networks that connect edge network 102 to origin servers 121 may be the same as one or more of the networks that provide the physical connectivity of edge network 102. Indeed, one or more of the networks that physically connect edge network 102 to end points 111 may be the same as the one or more of the networks that physically connect edge network 102 to origin servers 121. Data centers 103 and 105 communicate with end points 111 and origin servers 121—and with each other—by way of any suitable networking protocol such as Internet Protocol version 4 (IPv4), IPv6, Internetwork Packet Exchange (IPX), Open Shortest Path First (OSPF) IPsec, and any other network protocol, variation, or combination thereof. Data centers 103 and 105 may in some implementations be connected at the data link layer and as such may communicate via the Ethernet protocol, asynchronous transfer mode (ATM), the Point-to-Point protocol (PPP), and the like.

Traffic sent or received between end points 111 and edge network 102 may take one of multiple routes 110 to data center 103, represented by routes j, k, and l. Traffic sent or received between origin servers 121 and edge network 102 may take one of multiple routes 120 to data center 105, represented by routes x, y, and z. Data center 103 provides a point-of-presence where edge network 102 interfaces with the one or more networks that carry traffic to and from end points 111. Data center 105 provides a point-of-presence where edge network 102 interface with the one or more networks that carry traffic to and from origin servers 121. Edge network 102 may include additional data centers that serve as additional PoPs for interfacing with the same or other networks as data centers 103 and 105.

End points 111, which include end point 113, end point 114, and end point 115, are representative of computing devices capable of communicating with origin servers 121. Examples include—but are not limited to—laptop and desktop computers, tablet computers, mobile phones, wearable devices, entertainment devices, gaming devices, other server computers, Internet of Things (IoT) devices, or any other type of end point device.

Origin servers 121, which include server 123 and server 125, are representative of the various physical and/or virtual computing devices capable of storing content and providing the content via infrastructure service 101 to end points 111. Examples include, but are not limited to, server computers and data storage devices deployed on-premises, in the cloud, in a hybrid cloud, or elsewhere, by content providers such as enterprises, organizations, individuals, and the like. Examples of content included text, images, video, web pages, objects, applications, transactions, or any other type of content.

End points 111 communicate with infrastructure service 101 and origin servers 121 over transport layer connections that are established to facilitate the exchange of data. The connections may be established in accordance with a variety of communication protocols such as the transmission control protocol (TCP), the stream control transmission protocol (SCTP), and other connection-oriented protocols. Connectionless protocols such as the user datagram protocol (UDP) may also be employed in some implementations.

Domain name system (DNS) 118 is a highly simplified representation of a system capable of associating domains names with network addresses. End points 111 communicate with DNS 118 to obtain the network addresses of the various domains the client applications on end points 111 are attempting to reach. Examples includes websites, services, and applications and other such content provided by origin servers 121. Examples of client applications include, but are not limited to, natively installed and executed applications, mobile applications, browser-based applications, streaming applications, and any variation or combination thereof.

DNS 108 is representative of a system within infrastructure service 101 that is also capable of associating domain names with network addresses. DNS 108 may communicate with DNS 118 in some examples to resolve the network address for a domain name. In other examples, DNS 118 may redirect an end point to the network address for DNS 108 so that DNS 108 can resolve the domain name to a network address. Other variations are possible and are considered within the scope of the present disclosure.

In operation, end points 111 submit domain name translation requests to DNS 118 to translate a uniform resource locator (URL) or other such identifier into network addresses with which a given one of end points 111 can connect, engage in secure transactions, or the like. DNS 118 may communicate with DNS 108 in edge network 102 to resolve the domain name request. It is assumed for exemplary purposes that the network addresses routes to a PoP in edge network 102.

End points 111 address packets to the network address provided by DNS 118 and send them via one or more of paths 110 to edge network 102. In an example of content caching, end points 111 send content requests (e.g., HTTP GET messages) to the aforementioned network addresses, which route to PoPs in edge network 102. The requested content may be served from one of the PoPs or—if the content has not yet been cached or needs to be refreshed—can be obtained from the origin and then served to a given end point.

In such examples, the end points 111 establish transport layer connections with the servers in edge network 102 in order to obtain the requested content. However, in some scenarios the end points 111 establish transport layer connections with servers at the origin, as opposed to (or in addition to) the servers in edge network 102, in order to obtain content directly from the origin, engage in secure transactions or communications, or for other reasons.

Upon connecting to an origin server, an end point proceeds to setup a secure session with the server in accordance with TLS, SSL, or other security protocols. The end point and the server can then conduct their session securely by encrypting and decrypting their communications using the keys exchanged as part of the agreed upon security protocol.

Figure 2:
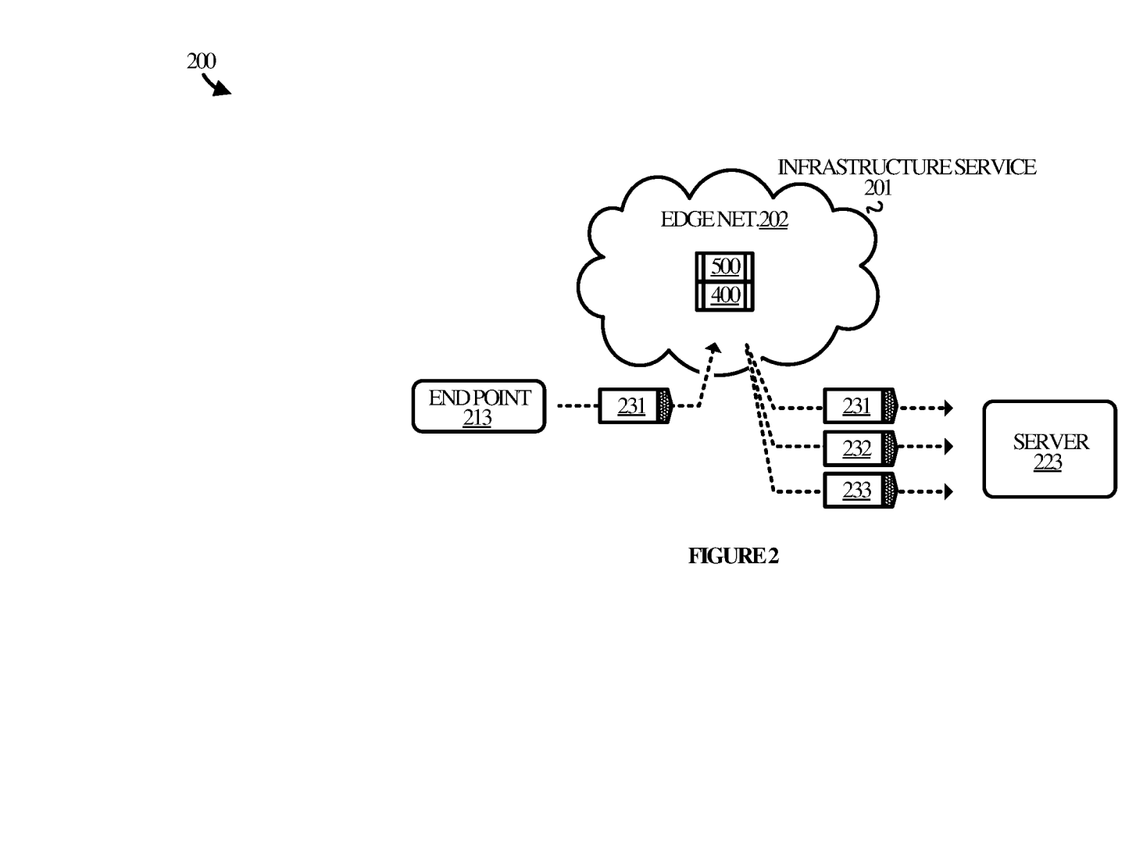
FIG. 2 illustrates another operational environment in an implementation.
Figure 3:
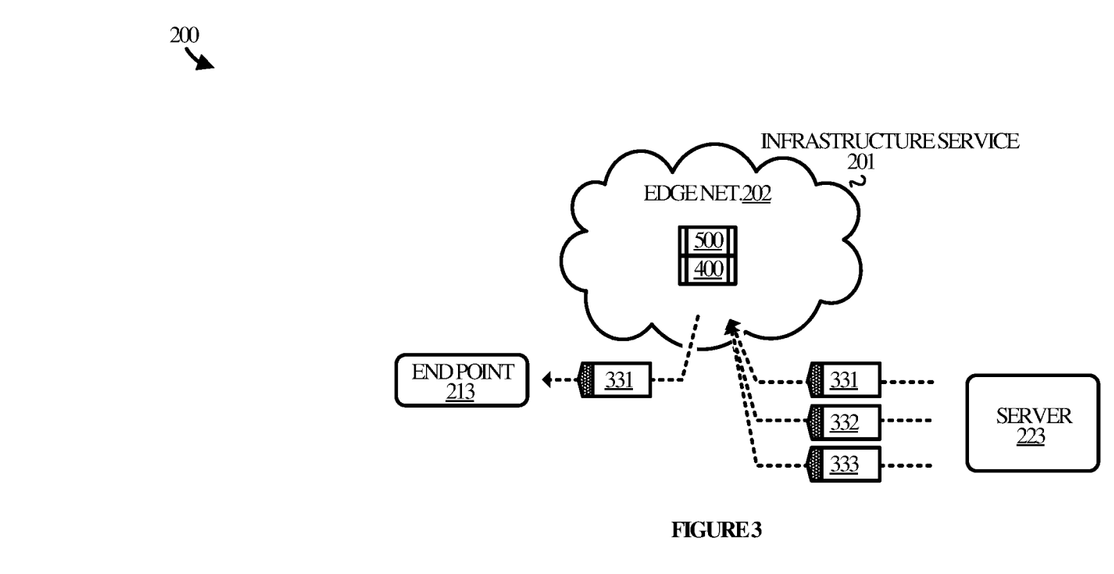
FIG. 3 illustrates another operational environment in an implementation.

FIGS. 2 and 3 illustrate additional operational architecture 200 in an example implementation of security testing in an edge network. Operational architecture 200 includes infrastructure service 201 in communication with end point 213 and server 223. Infrastructure service 201 provides one or more functions for and/or on behalf of its customers such as edge computing, content caching, image optimization, content streaming, cloud security, load balancing, and traffic acceleration. Infrastructure service 201 can be similar to infrastructure service 101 described above and may include all the features described above. Additionally, end point 213 and server 223 may be similar to end points 111 and origin servers 121 described above. While shown here as a single end point 213 and server 223, these elements could also represent multiple elements as shown in FIG. 1. Edge network 202 can include all the features and elements of edge network 102 as shown in FIG. 1. The simplified representation shown in FIG. 2 is not meant to remove elements of the operational architecture of FIG. 1, but merely to simplify the representation. Each of the features of FIG. 1 may also be present in the operational architecture of FIG. 2.

In operation, a message 231, such as a content request is sent from end point 213 to edge network 202. The message may be addressed based on a network address provided by a DNS request. The message 231 contains a header portion and a payload portion. Message 231 is modified through testing process 400, described in FIG. 4, and modified message 232 is sent to server 223. Similarly, content request 231 is modified through testing process 500, described in FIG. 5, and modified message 233 is sent to server 223. Responses 331-333 to message 231 and modified messages 232 and 233 are received from server 223. Here response 331 represents the response to content request 231, response 332 represents the response to content request 232 and response 333 represents the response to content request 233. Response 331 is forwarded to end point 213. In an embodiment, responses 332 and 333 include responses to modified content requests 232 and 233, which may, for example, include modified header information, or may omit header information. Responses 332 and 333 are used, either on their own or in conjunction with response 331 to create a security report. Because response 331 is provided to end point 213, there may not be any reason for end point 213 to know that message 231 has been used as a part of security testing or experimentation. End point 213 may receive the requested information in a timely manner as expected. Further, there may be no need to inform server 223 that security testing is occurring. Rather, server 223 responds to message 231 and modified messages 232 and 233 as if three separate content requests were received from one or more end users. Edge network 202 processes the resulting information the create a security report.

Figure 4:
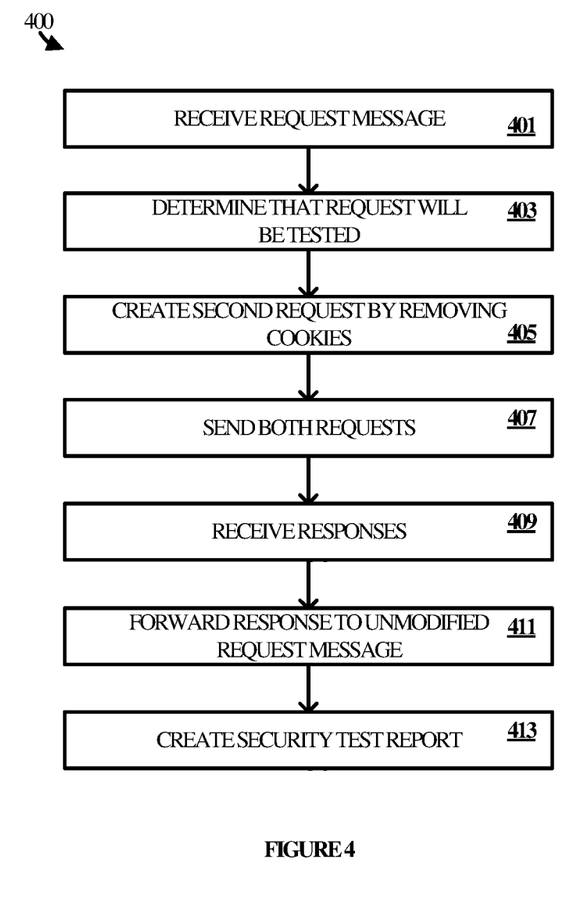
FIG. 4 illustrates a chaos injection process in an implementation.

FIG. 4 illustrates a process of security chaos experimentation in an implementation. In step 401, a message is received in the edge network. The message can be addressed according to a network address that was obtained from a DNS lookup process. In an implementation, the message may be a content request for internet content associated with a particular URL or website. The content is originated at an origin server. In many cases, the origin server may be duplicated, such that there are multiple sources of the content. This can provide protection against data loss in the case of failure at a single origin server. Additionally, the content can be stored in various additional servers, such as cache servers, located around the world. The DNS process response can return an address for a cache server, or a PoP in an edge network, rather than an origin server. The cache server or edge network can provide caching of content or other processing, relieving some of the operational burden from the origin server.

In an implementation, the edge network receives the request message, and handles processing related to security testing associated with the URL or website requested in the message. Thus, in step 403, the edge network can determine that the request message will be utilized in security testing. This determination may be random or according to a predetermined probability or according to some selection criteria. For example, the edge network may select every message for testing or experimentation, or it may select every hundredth message for testing or experimentation. The edge network could select from among only logged out users with anonymous cookies, or only users in a specific geographical region, for example. This selection can be static or dynamic. For example, the testing may select every hundredth message for testing during a time period when network traffic is slow and may select every millionth message for testing during a time period when traffic is heavy. Alternatively, the edge network may select no messages for testing when network traffic is heavy, opting to do all testing during light network traffic.

In step 405, a modified request is created. The request message contains a payload portion, which, in the case of a request message, for example, may contain the actual content that is requested. The message also contains a header portion. This header portion may contain a variety of elements. For example, the header portion may contain a source address, a destination address, connection data, password or security information, cookies, authentication tokens, validation information, hash information, flags, or other elements. Some or all of this content may be required by the origin server or other server providing the content in order to provide the content. In some cases, this information is intended to be required, but due to implementation errors, software bugs or other errors, the intended verification doesn't occur. The modified request removes some or all of the information in the header portion in order to test the instructions and experiment or verify the verification processes on the origin server (or other server providing content). By sending both a modified and a non-modified request and comparing the responses from the origin server or other content source, the edge server can detect and/or identify improper design, implementation or configuration of the content source. For example, the edge network may remove some or all of the cookies for the request message. Thus, the modified request may include the same payload and all of the header information from the original request message except for the cookies. The edge network may alternatively remove some or all of the verification information from the header portion of the request message, leaving the payload and remainder of the header portion intact. While only one modified request message is discussed here, more than one modified request message may be sent.

In step 407, both the request message and the modified request message(s) are sent to the origin server or other server that will be responding to the request message. This may be the original origin server, a duplicate origin server, a cache server, or a server within the edge network, for example. In step 409, the edge network receives the responses back from the server. These responses may be received at the same time, or separately. The responses may contain the content that was requested by the request message, or may contain some indication, such as that the content was not available, or that the requirements were not met in order for the content to be delivered.

The response to the unmodified request message is forwarded to the end point in step 411. The remaining responses correspond to the modified request messages and are not necessarily forwarded to the end point. Rather, the remaining responses are used to create a security test report in step 413. For example, if the modified request message was modified to remove the verification information from the header portion, the security verification report may include information related to the server's response to a request message missing verification information. The report may be related to a single modified request message or multiple request messages. Similarly, responses to modified request messages may be collected over time or summarized with data stored over time. The report may describe the server response to a variety of message modifications. This report can be provided to a manager or user in any appropriate format, such as through email, through a portal, or some other reporting method.

Figure 5:
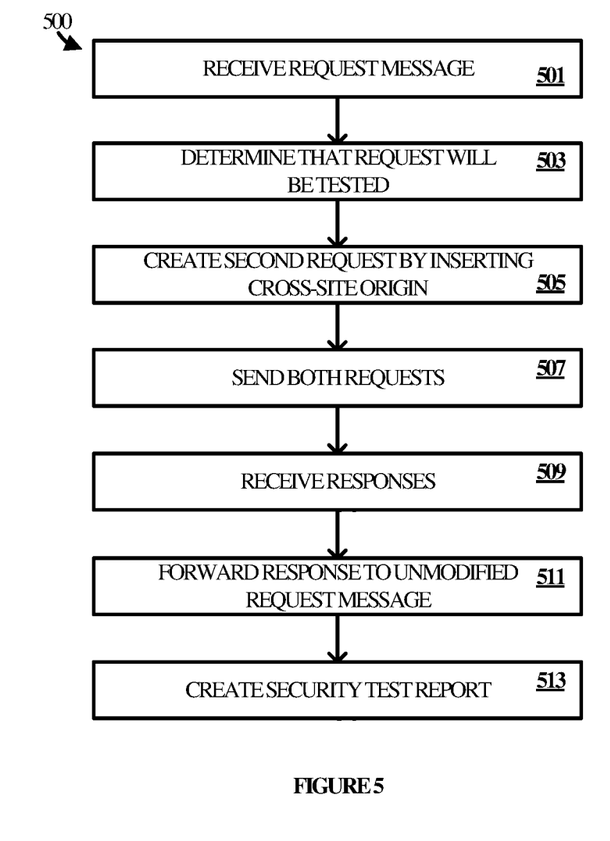
FIG. 5 illustrates cross-site origin injection process in an implementation.

FIG. 5 illustrates a process similar to that illustrated in FIG. 4. In an implementation, the edge network receives a request message in step 501. The edge network determines in step 503 that the request message will be used for testing, such as security chaos experimentation.

In step 505, the edge network modifies the request message to create a modified request message by inserting a cross-site origin. This can involve simply replacing the source address or source site with a different address or site. In an implementation, the origin server compares the origin or source address in the header portion with other information available to the server (the cookies in the header portion, for example) to identify whether the source address or origin matches what the server expects to see as a source address or origin based on the other information available. If the source address or origin do not match what is expected, then the server may reject the request. Thus, the modified request message with a cross-site origin inserted can test the server's ability to reject a cross-site origin request.

As above, in step 507 the edge network sends both the request message and the modified request message to the server and receives responses to both messages in step 509. The edge network forwards the incoming response as a response to the original incoming request received by the edge network and creates a security test report based at least on the response corresponding to the modified request message.

Figure 6:
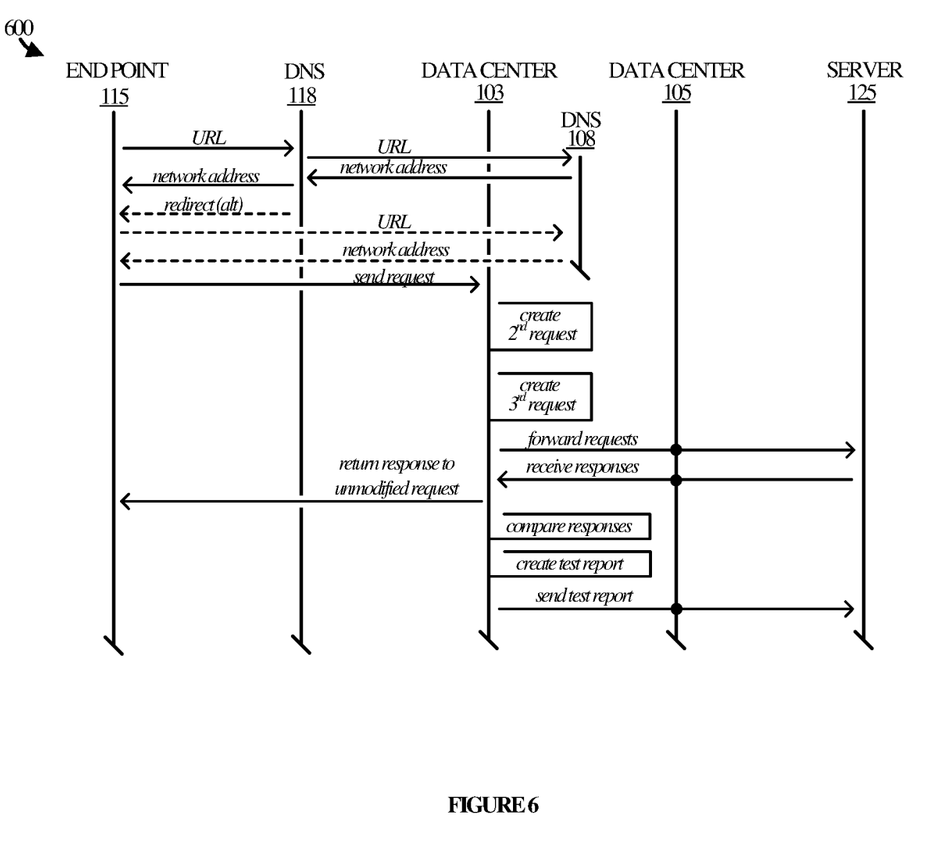
FIG. 6 illustrates an operational sequence in an implementation.

FIG. 6 illustrates an implementation as executed on the elements of FIG. 1. End point 115 sends a DNS request to DNS 118 for a given URL. DNS 118 may have the information to respond immediately to the DNS request, or may forward the request to another DNS, such as DNS 108, within edge network 102. While no other DNS are shown, the request could be further distributed in order to provide the network address requested. The network address is then provided back to end point 115, either directly from DNS 118, DNS 108, or another DNS. The network address provided addresses a PoP within edge network 102. Alternatively, DNS 108 may respond to the DNS request from end point 115 by directing end point 115 to resubmit the DNS request directly to DNS 108 (or some other DNS). DNS 108 can then respond directly to end point 115 with the requested network address.

End point 115 then creates a request message and sends it to the network address, which is associated with data center 103. The request message comprises a payload and header information. The header information may include a variety of information, such as a variety of cookies and validation information, source, and destination addresses, among others. Data center 103, which is part of edge network 102, receives the request message and determines whether to perform security testing using the request message. If edge network 102 decides to use the request message as part of security testing, then data center 103 creates a second and third request based on the original request message. It should be understood that edge network may include a management or control server that may create the modified request messages instead of, or in conjunction with, data center 103. The first and second modified request messages could include any type of modification to the header information of the request message. By way of example, the first modified request message may be identical to the request message, except for the omission of some or all of the cookies present in the original request message. The second modified request message may be identical to the original request message, except that the origin information in the header portion may be modified. Other modification can be made. In an implementation, the modifications may be specifically targeted to various security checks that are performed by server 125 prior to providing the content. After the modified request messages have been created, all of the request messages are forwarded to server 125. Note that this forwarding may pass through other servers on the way to server 125. For example, FIG. 6 shows the messages passing through data center 105, also a part of edge network 120, before being delivered to server 125. Server 125 may be an origin server, a cache server, and edge server, or some other server capable of responding to the request messages. While FIG. 6 shows all of the messages forwarded to server 125 at the same time, it should be understood that the messages may be sent individually. By way of example, the original request message may be forwarded to server 125 while data center 103 is still creating the first and second modified request messages. The creation, transfer, and response receipt of the messages could each occur independently, such as through the use of different instances of a web accelerator service, such as Varnish configuration language. In an implementation, separate connections can be established between data center 103 and server 125 for each of the requests.

Responses to the request messages are then received by data center 103. The response corresponding to the original request message is returned to end point 115. By returning the response to the original request message, the risk of interruption to client facing services is reduced. The responses corresponding to the modified request messages are analyzed within edge network 102. In an implementation, the responses corresponding to the modified request messages are never transferred to end point 115 or to any end user. These responses can be used only for creating the security verification report. Edge network 102, either in data center 103 or in another processing center, compares the responses to create a security test report. In an implementation, the responses may correlate to 1) the original unmodified request message, 2) a request message modified to remove cookies, and 3) a request message modified to insert a cross-site origin. Edge network 102 can then compare the responses to determine whether the server provides a different response when cookies are omitted, or a cross-site origin is inserted. It should be understood that in some cases, the response corresponding to the original request message does not need to be analyzed in order to create the security test report. The test report could take on any of numerous possible forms. The test report could be a real-time statement or indication that a server or website requires or does not require cookies, for example. The test report could also be a summary of multiple responses, corresponding to one or more servers or websites. In any case, the security test report is delivered. In FIG. 6, the security test report is delivered to server 125. Alternatively, the security test report may be delivered to a management entity within or external to the edge network. The security test report may be delivered to a user though a management portal, directed message or some other form. The security test report could be recorded in an activity log, such that a user must request the test results in order to receive them.

Figure 7:
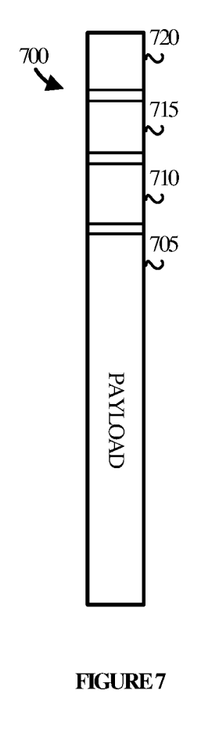
FIG. 7 illustrates a request message in an implementation.

FIG. 7 illustrates a message 700 as described above. Message 700 represents any message, such as a request message, content message, or content request, for example. Request message 700 includes payload 705. Payload 705 comprises the substance of the message. For example, in an implementation, payload 705 comprises the get request identifying the content requested. While shown as a single element, payload may be separated into multiple locations. For example, in the textual protocol version of HTTP, the request line and the request body are separated. In an implementation, using HTTP, the request line may come first, followed by the header portion, which may include one or more headers, and eventually followed by the request body. In some cases, there may be elements, or empty lines between the payload and the header portion. Headers 710, 715 and 720 combine to form the header portion of message 700. While 3 headers 710, 715 and 720 are shown, it should be understood that any number of headers may exist in message 700. For example, headers 710, 715 and 720 may be some combination of source address, a destination address, connection data, password or security information, cookies, authentication tokens, validation information, hash information, or flags. In an implementation, header 710 is a cookie provided by the origin server, which is expected to be included with each communication from a user. Header 715 can be a source address. Header 720 can be an additional header, such as a destination address or connection data, among other items. When the message 700 is modified to create a modified message, that modification may include modification of the source address which is header 715. The cookie in header 715 is not modified, however. When the origin server receives message 700, the origin server will be able to respond properly, as the cookie in header 710 and the source address in header 715 correctly corroborate each other. When the origin server responds to the modified message, however, the unmodified cookie in header 710 will not corroborate the modified source address in header 715. The origin server, when the cross-site origin checks are properly functioning, will therefore provide an error of some type, indicating that the content cannot be provided. The edge network will then be able to use these responses to create a security test report. It should be understood that one of ordinary skill in the art may understand many other security experiments that could be run by selecting and modifying different elements of the headers 710, 715 and 720. This description is not meant to be limited by the specific combinations described.

Figure 8:
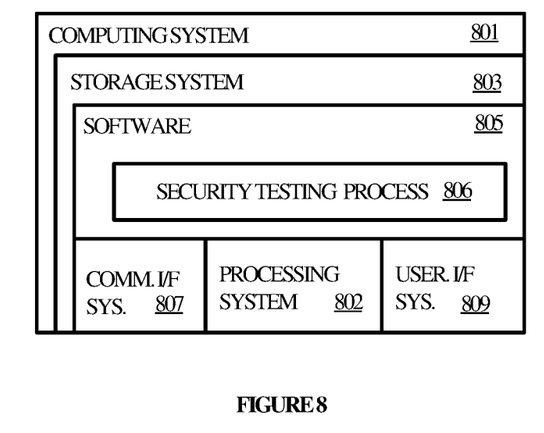
FIG. 8 illustrates a computing system suitable for implementing the various operational environments, architectures, processes, scenarios, and sequences discussed below with respect to the Figures.

FIG. 8 illustrates computing system 801 that is representative of any system or collection of systems in which the various processes, programs, services, and scenarios disclosed herein may be implemented. Examples of computing system 801 include, but are not limited to, server computers, routers, web servers, cloud computing platforms, and data center equipment, as well as any other type of physical or virtual server machine, physical or virtual router, container, and any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements security testing process 806, which is representative of the security testing process discussed with respect to the preceding Figures. When executed by processing system 802 to provide a security testing process, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal or a carrier wave.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including security testing process 806) may be implemented in program instructions and among other functions may, when executed by processing system 802, direct processing system 802 to operate as described with respect to the various operational scenarios, sequences, and processes illustrated herein. For example, software 805 may include program instructions for implementing a message modification process to modify message headers as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide packet redirection. Indeed, encoding software 805 on storage system 803 may transform the physical structure of storage system 803. The specific transformation of the physical structure may depend on numerous factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in many ways to form multiple embodiments. As a result, the invention is not limited to the specific embodiments described above, but only by the claims and their equivalents.

What is claimed is:

1. A method of operating a server in an infrastructure service to verify security of a website, the method comprising:

receiving a request message that comprises a header portion and a content indicator that indicates at least a portion of a website that is requested, wherein the header portion comprises verification information;

determining that the request message will be tested;

removing the verification information from the header portion to create a modified header portion;

creating a second request message, wherein the second request message comprises the content indicator and the modified header portion;

forwarding, from the server, the request message and the second request message to a supply server;

receiving, at the server, a first response to the request message and a second response to the second request message;

returning, from the server, the first response in response to the request message;

comparing the first response and the second response; and creating a security report based on the comparison, wherein the security report indicates if the server provided the requested portion of the website to the server in response to receiving the second request message with the modified header portion that did not include the verification information.

2. The method of claim 1, wherein the supply server is an origin server.

3. The method of claim 1, wherein the infrastructure service comprises an edge network, and the server is a server within the edge network.

4. The method of claim 3, wherein the supply server is a server within the edge network.

5. The method of claim 1, wherein removing the verification information from the header portion comprises removing the verification information and one or more cookies from the header portion to create the modified header portion.

6. The method of claim 1, wherein removing the verification information from the header portion comprises removing the verification information from the header portion and inserting a cross-site origin into the header portion to create the modified header portion.

7. The method of claim 1, further comprising transferring the security report for delivery to a manager associated with the website.

8. The method of claim 1, further comprising:
receiving a further request message, wherein the further request message comprises a further header portion and a further content indicator that indicates at least a portion of a further website that is requested;
determining that the request message will not be tested;
forwarding the further request message to a supply server without creating a second further request message;
receiving a further response to the further request message; and
returning the further response in response to the further request message.

9. A server in an infrastructure service, the server configured to:
test security of a website, wherein testing the security of the website comprises:
receiving a request message that comprises a header portion and a content indicator that indicates at least a portion of the website that is requested, wherein the header portion comprises verification information;
determining that the request message will be tested;
removing the verification information from the header portion to create a modified header portion;
creating a second request message, wherein the second request message comprises the content indicator and the modified header portion;
forwarding, from the server, the request message and the second request message to a supply server;
receiving, at the server, a first response to the request message and a second response to the second request message;
returning, from the server, the first response in response to the request message;
comparing the first response and the second response; and
creating a security report based on the comparison, wherein the security report indicates if the server provided the requested portion of the website to the server in response to receiving the second request message with the modified header portion that did not include the verification information.

10. The server of claim 9, wherein the supply server is an origin server.

11. The server of claim 9, wherein the infrastructure service comprises an edge network, and the server is a server within the edge network.

12. The server of claim 11, wherein the supply server is a server within the edge network.

13. The server of claim 9, wherein removing the verification information from the header portion comprises removing the verification information from the header portion and one or more cookies from the header portion to create the modified header portion.

14. The server of claim 9, wherein removing the verification information from the header portion comprises removing the verification information from the header portion and inserting a cross-site origin into the header portion to create the modified header portion.

15. The server of claim 9, wherein testing the security of the website further comprises transferring the security report for delivery to a manager associated with the website.

16. The server of claim 9, wherein testing the security of the website further comprises:
receiving a further request message, wherein the further request message comprises a further header portion and a further content indicator that indicates at least a portion of a further website that is requested;
determining that the request message will not be tested;
forwarding the further request message to a supply server without creating a second further request message;
receiving a further response to the further request message; and
returning the further response in response to the further request message.

17. A server in an infrastructure service, the server comprising:
a processor and tangible memory;
the tangible memory storing instructions, which, when executed by the processor, instruct the processor to test security of a website, wherein testing the security of the website comprises:
receiving a request message that comprises a header portion and a content indicator that indicates at least a portion of the website that is requested, wherein the header portion comprises verification information;
determining that the request message will be tested;
removing the verification information from the header portion to create a modified header portion;
creating a second request message, wherein the second request message comprises the content indicator and the modified header portion;
forwarding, from the server, the request message and the second request message to a supply server;
receiving, at the server, a first response to the request message and a second response to the second request message;
returning, from the server, the first response in response to the request message;
comparing the first response and the second response; and
creating a security report based on the comparison, wherein the security report indicates if the server provided the requested portion of the website to the server in response to receiving the second request message with the modified header portion that did not include the verification information.

18. The server of claim 17, wherein removing the verification information from the header portion comprises removing the verification information from the header portion and one or more cookies from the header portion to create the modified header portion.

19. The server of claim 17, wherein removing the verification information from the header portion comprises removing the verification information from the header portion and inserting a cross-site origin into the header portion to create the modified header portion.

20. The server of claim 17, wherein testing the security of the website further comprises transferring the security report for delivery to a manager associated with the website.

* * * * *